Sept. 15, 1970  H. D. ROMBERG  3,528,568
SILO UNLOADING DEVICE
Filed Jan. 19, 1967  2 Sheets-Sheet 1
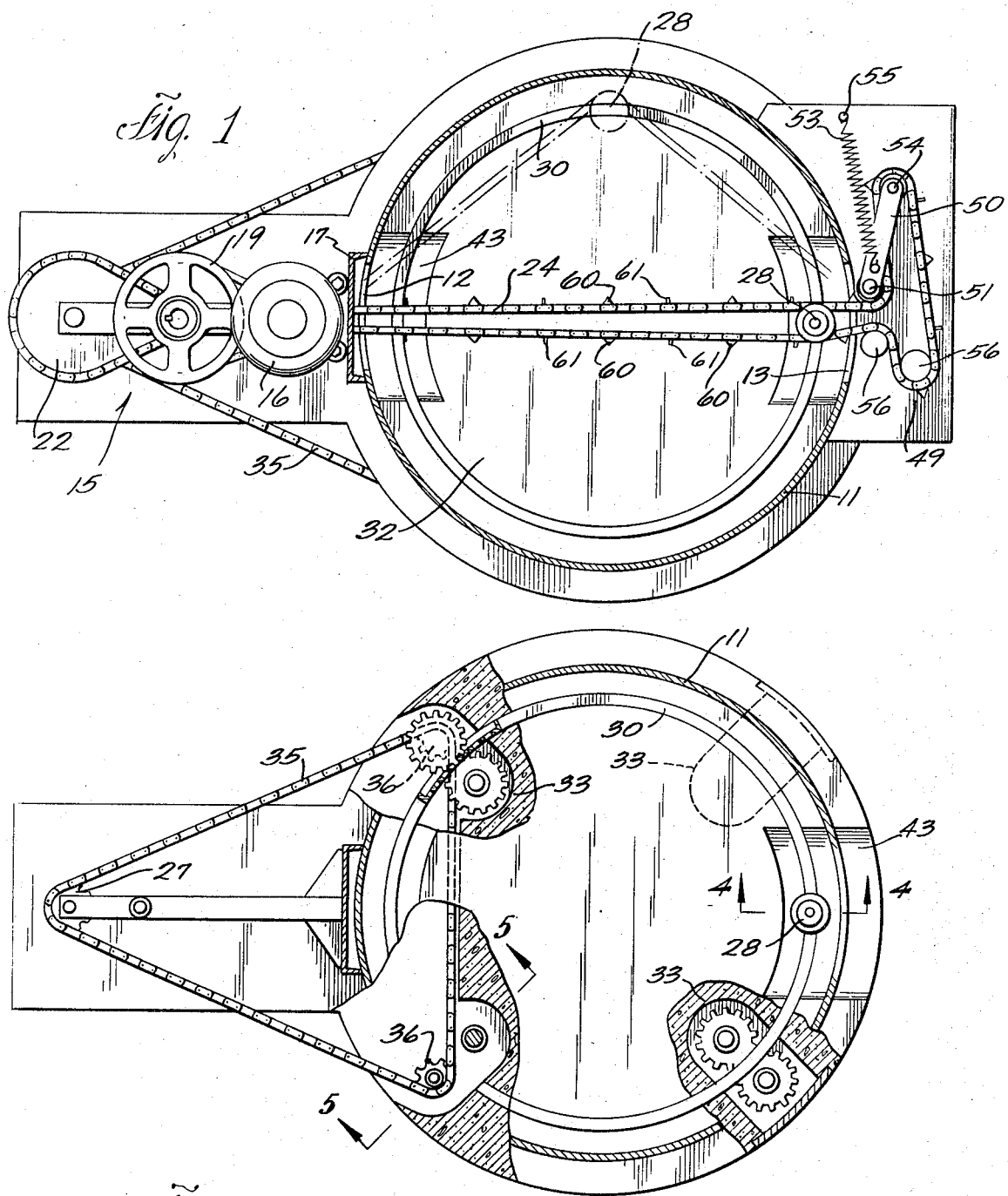
Inventor
Harvey D. Romberg
By
Attorney Sept. 15, 1970 H. D. ROMBERG 3,528,568
SILO UNLOADING DEVICE
Filed Jan. 19, 1967 2 Sheets-Sheet 2
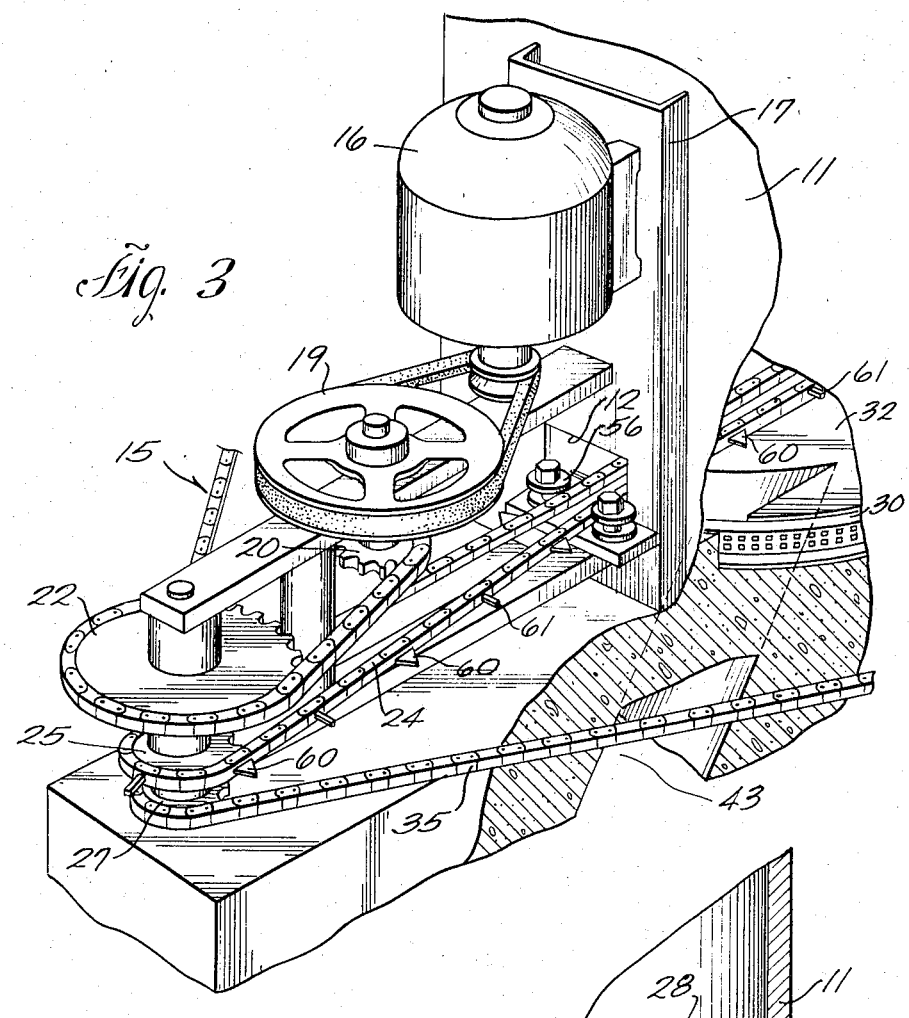
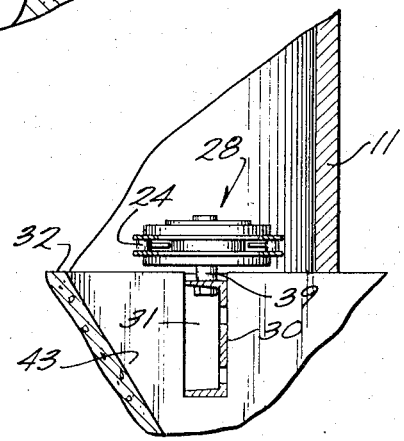
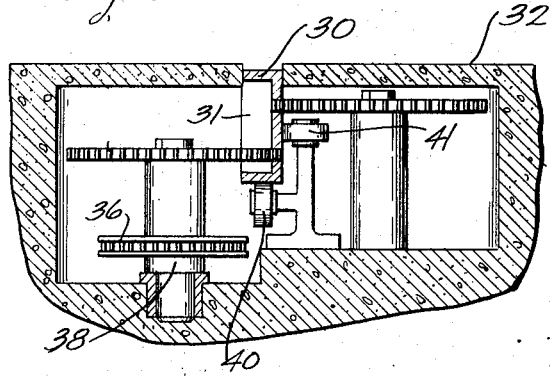
Inventor
Harvey D. Romberg
By
Attorney United States Patent Office 3,528,568
Patented Sept. 15, 1970

3,528,568
SILO UNLOADING DEVICE
Harvey D. Romberg, Rte. 1, Winneconne, Wis. 54986
Filed Jan. 19, 1967, Ser. No. 611,218
Int. Cl. B65g 65/42
U.S. Cl. 214—17                                1 Claim

ABSTRACT OF THE DISCLOSURE

A bin unloader for removing the contents of a bin through an opening adjacent the lower extremity thereof. The unloader including an operable cutting piece which extends through one wall of the bin to and through the opposite wall thereof. The cutting piece when operable providing for cutting and conveying of the contents of the bin for removal therefrom.

---

The present invention relates to an improvement in silo unloading devices, of the type which are automatic or semiautomatic in the removal of predetermined amounts of materials from the storage bin or silo. This device may be used in conjunction with existing or specially constructed forage storage silos and the like.

It is an object of the present invention to provide a device for easily and efficiently removing the amount of feed necessary for feeding livestock under normal feeding requirements. The difficulties and inefficiencies of present devices makes the work of the farmer much too difficult and dangerous. Plans are necessary in farming of today and tomorrow to create safer and more useful machinery.

A further object therefore of this invention is to develope an unloading device for use with silos which will be extremely safe to maintain and service.

A yet further object of this invention is to construct an unloader which is adaptable to silos of varying diameter and having extremely large diameters, even diameters beyond those presently designed for bottom unloading devices.

Another object of this invention is to provide an unloading device mechanism and construction which retains the thermos effect necessary in storage bins for preserving the freshness of the stored materials.

Another object of this invention is to provide a mechanism which can easily overcome the critical problems that usually result from an overload situation.

A further object of this invention is to provide a silo unloading construction which permits removal of all materials at the bottom of the silo to prevent spoilage, resulting in a first in first out process.

Another object of the present construction is to permit variable speed operation of the cutting chain and unloading operation and thereby permitting regulating the speed of removal of materials from the bin as well as properly controlling the device during any servicing operation.

The present invention also eliminates the need to enter a silo on the part of the person servicing the device. In the past, several times a year, farmers, in attempting to service automatic unloading silos, either are killed or seriously hurt in the process.

The construction of this invention is also intended to be adaptable to existing silo devices, and is not necessarily intended to be designed for a specific silo construction.

Various other objects of the present invention will become apparent as the description of the device proceeds, and various modifications and changes may be made to the device without departing from the spirit of the invention. Such additional objects and modifications and changes are intended to be covered by the scope of the appended claims.

In the drawings:

FIG. 1 is a top plan sectional view of a silo having the device installed at the extreme bottom of the silo, with the chain and guide in a straight-through position;

FIG. 2 is a top plan sectional view of the ring drive mechanism which is located just beneath the mechanism shown in FIG. 1;

FIG. 3 is a perspective view of the drive mechanism for both the cutting chain complex and the drive ring mechanism;

FIG. 4 is a sectional view of the drive ring, showing the mounting of the guide sprocket wheel, shown as a sectional view taken on the line 4—4 of FIG. 2;

FIG. 5 is a sectional view, taken on line 5—5 of FIG. 2, showing the mounting and support for the drive ring and also the drive mechanism for the movement of the ring.

Referring now to the drawings and more particularly to FIG. 1 of the drawings, the metal or fibreglass wall 11 of the silo has openings 12 and 13 at opposite sides which accommodate the various mechanisms of this device.

The drive mechanism assembly 15 consists of an electric motor 16 mounted on a channel bracket 17 which is fixed to the silo wall 11. A V-belt pulley construction 19 becomes activated by the motor 16 and in turn the sprocket 20 which is fixed to the shaft of the pulley 19 rotates in the same direction and in turn, by the chain drive action of chain 22 causes simultaneous action and motion of the cutting chain 24, sprocket 25 and the drive ring driving sprocket 27.

From FIG. 1, the closer and more detailed view of FIG. 3, and the other drawings, it becomes obvious that the driving mechanism assembly 15 becomes conveniently and compactly located entirely to one side of the silo. On the opposite side of the silo is located the mechanism which permits keeping the cutting chain 24 taut at all times as well as providing for the free movement in and out of the silo the necessary amount of excess cutting chain 24, necessitated by the rotation of the guide sprocket 28 about the interior of the silo.

In FIG. 2 the drive ring 30, which is a corrosion resistant metal channel, is accommodated within a continuous recessed channel 31 which is circular and formed in the floor section 32 of the silo. This floor section 32 would in most cases be made of steel or fibreglass or other non porus material to preserve the thermos action in such a device. A series of mounting sprockets 33 are spaced at desired intervals about the circumference of the drive ring 30 to both support it and to further provide for assisting rotating the drive ring 30 in its recessed position, continuously about within its channel 31. FIG. 2 further shows the chain 35 which when driven rotates the sprockets 36 and in turn provides positive rotational drive for the drive ring 30.

The rotational drive motion of sprockets 36, which are fixedly mounted on spindles 38, force the sprocket 37 which is also fixed to spindle 38 to rotate and thus drive ring 30. The guide sprocket 28 is mounted for rotation on the spindle 39 and accommodates the chain 24.

For purposes of providing easy rotation of the drive ring 30 and also to prevent locking of the ring 30 in a position when stopped, a series of rollers 40 is provided to provide a verticle support at a number of places along its lower edge and also with a series of rollers 41 to properly space the drive ring 30 within its channel area 31.

Two chute-like openings 43 are provided for silage removal; cut silage which is driven and carried by the chain thus is removed from the silo through these openings. Both of the mechanisms 15 and 49 are intended to be covered by air tight metal or fibreglass covers and may be of any appropriate design. These are not shown in the drawing. Removal of the covers becomes necessary when operation of the device begins. Gravity permits removal of cut silage through the openings 43, or mechanical means may be employed.

The toggle like action of the mechanism 49 is necessary to permit the drawing in and easing out of the chain 24 as rotation of the guide sprocket 28 by its drive mechanism changes the position of the sprocket 28. When guide sprocket 28 is in the position as shown at 29 of FIG. 1, it is obvious that more length of chain 24 is necessary. The bar 50 rotates about pivot point 51 and coil spring 53 continually urges the opposite end sprocket 54 toward the anchor point 55 of the coil spring 53. Thus slack or excess chain 24 is stored outside the silo itself and is automatically fed to the operation as the guide sprocket 28 rotates continuously about the channel 31. It is apparent that at the position 29 of guide sprocket 28 the maximum length of chain 24 is within the silo and needed for operation and that when guide sprocket 28 is in its position as shown in FIG. 1 that the least length of chain 24 is required to be within the silo interior.

Various auxiliary sprockets and guides 56 provide a defined space and limited location for the movement of the chain 24 during the operation of the invention. The two series of mounting sprockets 33 closest to the drive mechanism 15 are of course the only series necessary for driving and thus are the only ones to need the additional chain drive sprocket 36, since the others serve the described purpose of mounting the drive ring 30 without being a part of the positive driving mechanism.

The operator of this device, requiring a predetermined amount of silage for feeding cattle, has merely to remove the air-tight covers, and then set the motor or prime mover 16 in action and operation then provides for a continuous rotation of the chain 24 within the silo and the continuous rotation of the guide sprocket 28 about the interior of the silo within its channel 31. Operation of this device permits cutting a continuous thin slice from the bottom portion of the silage within the silo, thus providing for removal of the first silage placed within the silo continuously.

The type of chain 24 used may vary with the particular needs and usually has a series of cutters 60 and also a series of drag bar or removal bars 61.

It is pointed out that at all times there is a section of the chain which travels straight through from the drive mechanism 15 through opening 12 to the opposite opening 13 where the linkage mechanism 49 is located. This permits easily repairing the chain or other parts of the device. It is further contemplated that a series of removable air-tight panels can be spaced about the circumference of the silo in positions to permit repairing of the device completely from the outside when the guide sprocket becomes immovable in a location not easily accessible to the normal openings 12 and 13.

Also, it is specifically intended that a clutch arrangement could be provided to permit rotation of the cutting chain 24 while leaving the guide sprocket 28 in a set position, although the sprocket 28 is always free to rotate and guide the cutting chain 24. Likewise, the guide sprocket 28 could be made to operate and the guide ring 30 rotate while the cutting chain is either reversed or inactive.

Variations in the speed of the motor 16, and regulation of the speed of rotation of guide ring 30 in its channel 31 could provide variation in removal of silage from the silo.

Various embodiments of the invention may be employed within the scope of the accompanying claim.

I claim:

1. A bottom unloading mechanism for a silo having oppositely disposed openings in the side wall adjacent the bottom thereof, said mechanism comprising an endless cutting chain extending across the bottom of said silo and through said openings, means at each end of said chain located exteriorly of the silo for guiding and supporting said chain, one of said means including means to yieldably tension said chain, means for driving said chain, a guide member within said silo supported for movement in a circular path, means to move said guide member along said circular path, said guide member being disposed between the reaches of said chain, said chain engaging said guide member whereby said chain travels in a variable path defined by the position of said guide member.

References Cited

UNITED STATES PATENTS

| 812,230 | 2/1906 | Raymond. |
| 3,374,906 | 3/1968 | Zimmerman. |

OTHER REFERENCES

German printed application 1,143,148, January 1963.

ROBERT G. SHERIDAN, Primary Examiner